United States Patent [19]

Sakata et al.

[11] Patent Number: 4,579,135
[45] Date of Patent: Apr. 1, 1986

[54] VALVE FOR PREVENTING FUEL FROM FLOWING FROM THE VENT OF AN AUTOMOBILE FUEL TANK

[75] Inventors: Yoshiyasu Sakata, Saitama; Shigeru Kimura, Kamakura, both of Japan

[73] Assignees: Honda Giken Kogyo Kabushiki Kaisha, Tokyo; Nifco, Inc., Yokohama, both of Japan

[21] Appl. No.: 620,064

[22] Filed: Jun. 13, 1984

[30] Foreign Application Priority Data

Jun. 14, 1983 [JP] Japan .............................. 58-89843[U]

[51] Int. Cl.$^4$ ............................................. F16K 17/36
[52] U.S. Cl. ........................................ 137/39; 137/43; 137/202; 251/144
[58] Field of Search .................... 137/43, 39; 220/227, 220/373, DIG. 27; 251/144

[56] References Cited

U.S. PATENT DOCUMENTS 2,696,247 12/1954 Hiltner ................................. 137/43
3,614,960 10/1971 Pfrengle ............................... 137/43
3,765,435 10/1973 Schlanzky ........................ 137/43 X Primary Examiner—Larry Jones
Attorney, Agent, or Firm—Trexler, Bushnell & Wolters, Ltd.

[57] ABSTRACT

Disclosed is a valve for preventing fuel from flowing from the vent of an automobile fuel tank comprising a valve compartment and a float vertically movable in the valve compartment, said float having a longitudinal hole communicating with vent holes made in the ceiling of the flat body or in the seat of a head fixed to the ceiling of the float body, thereby allowing the vapor of the fuel to ascend through the longitudinal hole of the float body and fill the upper space defined by the inner surface of the valve compartment and the outer surface of the head of the float thus to maintain the same pressure in the upper space as in the fuel tank at all times. Thus, the float can descend immediately when the automobile returns from an inclined position to the horizontal position.

2 Claims, 4 Drawing Figures

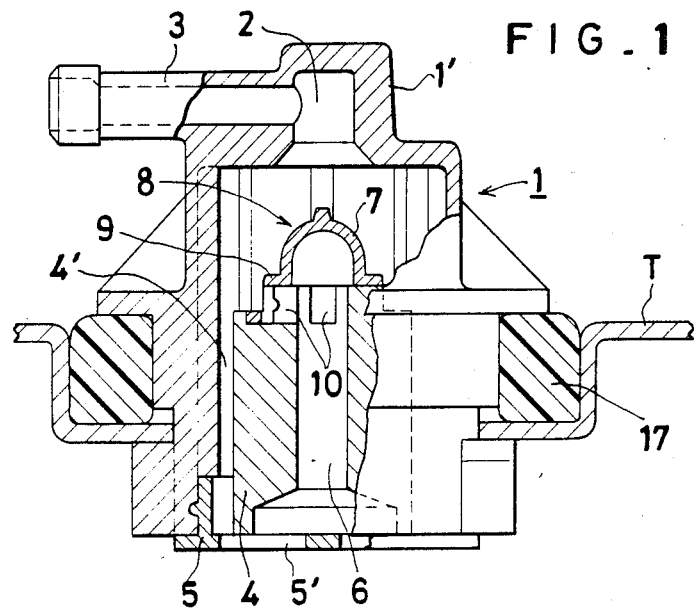
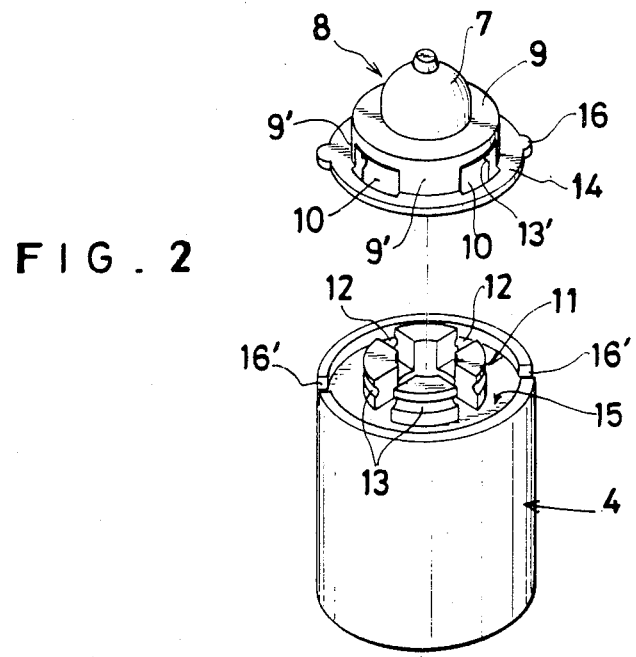

VALVE FOR PREVENTING FUEL FROM FLOWING FROM THE VENT OF AN AUTOMOBILE FUEL TANK

BACKGROUND OF THE INVENTION

1. Field of the Invention

This invention relates to a device for preventing fuel, e.g. gasoline, from flowing from the vent of an automobile fuel tank. In use, such fuel leakage preventing device is attached to the vent of an automobile fuel tank.

2. Description of the Prior Art

Usually a vent pipe is attached to the gasoline tank of an automobile for venting fuel vapor at a raised pressure from the tank to the atmosphere through an associated canister. It is necessary to provide means for preventing gasoline from flowing from the vent of the gasoline tank because otherwise, gasoline would flow out from the vent of the gasoline tank to disable the canister when the automobile inclines by a large angle while cornering or while stopped on a steep slope.

In a prior art device for preventing gasoline from flowing from the vent of the gasoline tank when the automobile body is inclined, a steel ball rolls down on an inclined surface to the vent of the gasoline tank, thereby closing the vent with the steel ball like a stopper (See U.S. Pat. No. 3,996,951). This device, however, cannot stop the leakage of gasoline when the gasoline splashes in the fuel tank. Such splashing is caused by sloshing of the gasoline in the fuel tank while the automobile is traveling.

In an attempt to overcome such drawback a device has been proposed which comprises a valve compartment fitted in an opening of the ceiling plate of a gasoline tank and a float vertically movable in the valve compartment. In operation, when the automobile body is inclined, the gasoline raises the float until the head projection of the float fits in the vent hole at the center of the ceiling of the valve compartment, thus closing the vent like a stopper (See Japanese Utility Model Application Public Disclosure No. 59(1984)-22373). When the automobile body returns to the horizontal position, the float descends by gravity to open the vent of the gasoline tank. Disadvantageously if the fuel remains in the annular clearance between the outer surface of the float and the inner surface of the valve compartment under the influence of surface tension, the float is caught by the combined effect of the surface tension of the trapped gasoline, the negative pressure applied to the head of the float around the vent of the tank and the positive pressure applied to the bottom of the float in the tank. In this state, the float cannot descend. When the float thus caught is subjected to the vibration transmitted from the running automobile, the fuel remaining in the annular clearance between the valve compartment and the float loses its surface tension intermittently, thereby moving the float up and down as if it were coughing, and allowing gasoline to leak to the canister through the vent of the tank.

As a remedy the annular clearance between the outer circumference of the float and the inner wall of the valve compartment is enlarged. However, the float is liable to move sideways, and this sideway movement causes a reduction in the exactness with which the head of the float fits in the vent hole of the gasoline tank. Also, disadvantageously the size of the valve compartment is enlarged accordingly.

SUMMARY OF THE INVENTION

The object of this invention is to provide a device for preventing fuel from leaking from the vent of an automobile fuel tank, which device assures the positive and reliable operation of an associated float, the normal flow of vapor fuel to the vent of the tank and the introduction of atmospheric air into the interior of the tank.

To attain this object the device for preventing fuel from leaking from the vent of an automobile fuel tank according to this invention comprises a valve compartment and a float vertically movable in the valve compartment, said float having vent holes provided in the ceiling of the float or in the circumferential wall of a head seat rising from the ceiling of the float and a longitudinal hole communicating with these vent holes, thereby allowing the inner pressure in the fuel tank to prevail in the upper space of the inside of the valve compartment through the longitudinal hole and the vent holes of the float, and keeping the same pressure applied to the ceiling of the float as in the fuel tank. Thus, the float can descend immediately after the automobile returns to its horizontal position. Even if the annular clearance between the outer surface of the float and the inner wall of the valve compartment is narrow, the float will always descend. Thus gasoline cannot remain but flows down along the annular clearance to the fuel tank, thereby eliminating the possibility of leaking to the canister and allowing the fuel vapor to flow to the vent holes, and then inducing air into the fuel tank.

Other objects and advantages of this invention will be better understood from the following description of preferred embodiments which are shown in the accompanying drawings.

BRIEF EXPLANATION OF THE DRAWINGS

FIG. 1 shows a longitudinal section of a fuel leakage preventing valve according to one embodiment of this invention;

FIG. 2 is an exploded perspective view of a float;

DESCRIPTION OF THE PREFERRED EMBODIMENTS

Figure 3:
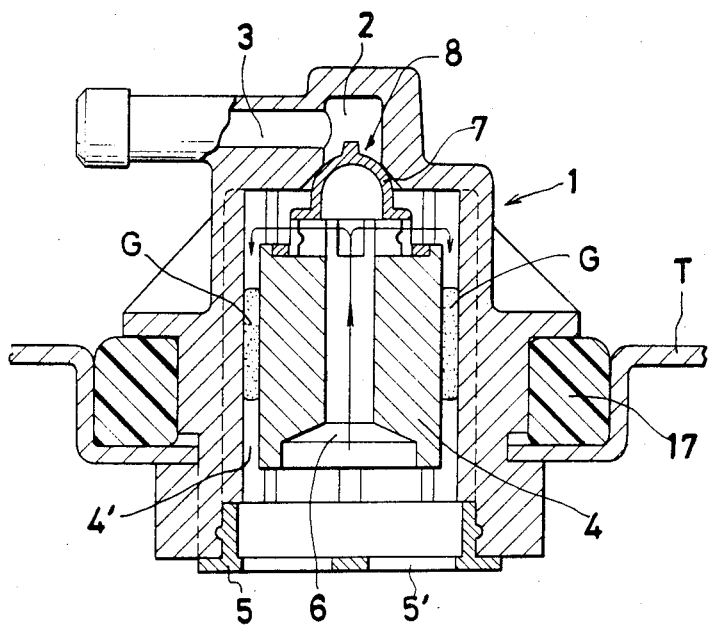
FIG. 3 shows a longitudinal section of the fuel leakage preventing valve in the condition in which the fuel surface has just left the bottom of the float.

Referring to the drawings, particularly to FIG. 1, a valve compartment 1 is a hollow cylindrical body having a top riser 1' and an opening at the bottom of the cylindrical body. The hollow cylindrical body may be molded from plastic or metal. As shown, the top riser 1' has a vent hole 2 opening at its bottom, and a connecting sleeve 3 radially extending from the riser to an associated canister for venting fuel vapor to the canister.

The valve compartment has a float 4 vertically movable therein and an apertured bottom plate 5 fitted in the open bottom of the valve compartment. The valve assembly is fitted in an opening of the ceiling plate of a fuel tank T, and is sealed with an O-ring 17 therearound. If occasion demands, a plurality of longitudinal ridges may be provided on the inner wall of the valve compartment and the outer surface of the float at regular intervals.

The float 4 is made of a material which can float on gasoline, such as foamed plastic. The apertured bottom plate 5 has a plurality of sector openings 5' separated by radial arms. When the automobile body is inclined, the fuel flows into the valve compartment 1 through the sector openings 5' of the bottom plate. The float 4 has a longitudinal hole 6 along its center axis. Also, it is coupled with a hollow head 8, and the hollow head 8 has a stopper portion 7 in the form of a semi-spherical shell. The stopper portion 7 of the hollow head is adapted to fit in the vent hole 2 of the valve compartment 1 when the float 4 is raised. The stopper portion 7 of the hollow head may of course take any form appropriate for the purpose of closing the vent hole of the valve compartment.

As shown in FIG. 2, the head 8 has a hollow flat seat 9 integrally connected to the semi-spherical stopper portion 7. The hollow flat seat 9 is somewhat larger in diameter than the stopper portion 7, and four vent holes 10 are made in the circumferential wall of the seat 9. These vent holes are separated by partitions 9'.

When the automobile body is in its horizontal position, the gasoline vapor rises to the vent hole 2 of the valve compartment 1 through the annular clearance between the outer surface of the float and the inner wall of the valve compartment, and at the same time the gasoline vapor rises up through the longitudinal hole 6 to fill the semi-spherical space of the stopper shell 7, and then it flows out of the circumferential vent holes 10 and into the vent hole 2 of the valve compartment 1.

The head 8 may be fixed to the float 4 by any conventional means appropriate for the purpose. In this embodiment, however, a circular sectored projection 11 is integrally connected to the ceiling of the float body, and the longitudinal hole 6 opens at the center of the ceiling of the float. As shown, the circular sectored projection 11 is composed of four sectors separated from each other by notches 12. Each sector has a slot 13 on the outer surface thereof, and each partition 9' has a ridge 13' on the inner surface thereof. Thus, the seat 9 of the head 8 is pushed on the circular sectored projection 11 until the ridge of each partition has snapped in the slot of the corresponding sector. It is, however, necessary that the partitions 9' not close the notches 12 so as to assure the passage of gasoline vapor from the longitudinal hole 6 to the interior of the valve compartment through the vent holes 10. For the purpose of eliminating the possibility of closing the vent holes 10 a collar 14 is integrally connected to the circumference of the seat, and the collar 14 has two projections 16. On the other hand the float has a recess 15 provided in the ceiling of the float for accommodating the collar 14 of the seat 9. The circumferential wall rising from the ceiling of the float has two notches 16' for accommodating the projections 16 of the collar of the seat 9. With this arrangement when the lower portion of the head 8 is snapped in the upper portion of the float 4 with the projection 16 of the former fitted in the notches of the latter, the vent holes 10 cannot be closed by the sectors 11, and then the vent holes 10 communicate with the longitudinal hole 6 through the notches 12.

In operation, when the automobile body is inclined, gasoline flows into the valve compartment to raise the float 4, to the level at which the stopper 7 of the head 8 fits in the vent hole 2, thus preventing the gasoline from flowing to the canister. When the automobile body returns to its horizontal position, the vapor from the gasoline rises through the longitudinal hole 6 of the float, and then passes through the notches 12 of the circular sectored projection and the vent holes 10 of the seat 9 of the head to fill the upper space defined by the head and the ceiling of the valve compartment, thereby maintaining the upper space at the same pressure as in the fuel tank. In this condition the float can descend by gravity when the automobile body returns to its horizontal position, whereby then the float assumes the position as shown in FIG. 1. This descending movement is assured even if the annular clearance 4' between the outer surface of the float and the inner surface of the valve compartment is small enough to allow gasoline G to remain under the influence of surface tension. More specifically the automobile body starts to return from its inclined position to the horizontal position, and accordingly the liquid surface descends to leave the bottom of the float, and then the gasoline vapor flows in the longitudinal hole of the float so that the float descends. Then, the gasoline flows down together and cannot flow from the vent holes to the canister.

In this particular embodiment the stopper 7 of the head 8 and the seat 9 communicate with each other by the hollow space. If occasion demands, however, the stopper 7 may be solid, and only the seat 9 may be hollow. Then, the bottom of the solid stopper is laid on the circular sectored projection 11 to close the ceiling of the notches 12.

Figure 4:
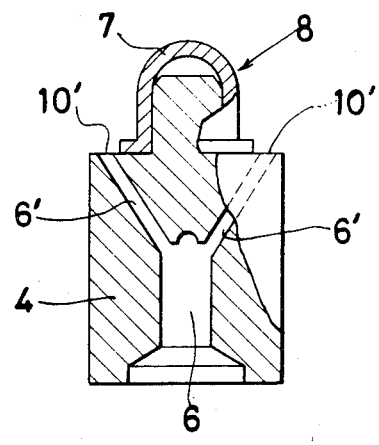
FIG. 4 is a longitudinal section of another example of a float for use in a fuel leakage preventing valve.

Also, in this particular embodiment the hollow seat 9 is integrally connected to the bottom of the stopper of the head, and the hollow seat 9 has a plurality of vent holes therearound. Alternatively, vent holes may be made as in FIG. 4. Specifically, the longitudinal hole 6 of the float 4 is made in the form of two divergent branches 6' at the upper end of the longitudinal hole and these branch holes 6' open on the annular area of the float ceiling around the outer periphery of the head 8.

As described above, in a fuel leakage preventing valve according to this invention a longitudinal hole is made in the float, using the upper opening of the longitudinal hole as a vent hole thereby to assure that the same pressure as that in the fuel tank is applied to the ceiling of the float body. With this arrangement when the automobile body returns to its horizontal position, the float descends immediately by gravity, and the gasoline flows down along the inner wall of the valve compartment. Thus, the fuel vapor is allowed to pass to the vent hole in the normal way, and at the same time, atmospheric air is allowed to flow into the fuel tank.

What is claimed is:

1. A valve for preventing the leakage of fuel from a fuel tank in an automobile, comprising: a valve compartment having at the upper end thereof a vent hole for fuel vapor and a sleeve connected to the vent hole for emitting fuel vapor to the outside of the valve compartment, and having an apertured bottom plate fitted in the bottom end thereof, said valve compartment being adapted to be mounted in the ceiling of the fuel tank, with the lower portion thereof extending into the fuel tank; and a single piece float longitudinally movably accommodated within the valve compartment and provided on the upper end thereof with a stopper head which is thrust from below into the vent hole of the valve compartment to close the vent hole, said float having an unobstructed longitudinal hole formed in the center thereof and at least one unobstructed vent hole formed in the stopper head so as to communicate with the unobstructed longitudinal hole of the float, said unobstructed longitudinal hole and said unobstructed vent hole providing a continuous free passageway through said float; the inner surface of the valve compartment and the outer surface of the float forming a clearance therebetween.

2. A valve for preventing the leakage of fuel from an automobile fuel tank having a ceiling, comprising: a valve compartment having at the upper end thereof a vent hole for fuel vapor and a sleeve connected to the vent hole for emitting fuel vapor to the outside of the valve compartment, and having an apertured bottom plate fitted in the bottom end thereof, said valve compartment being adapted to be mounted in the ceiling of the fuel tank, with the lower portion thereof extending into the fuel tank; and a single piece float longitudinally movably accommodated within the valve compartment and provided on the upper end thereof with a stopper head which is thrust from below into the vent hole of the valve compartment to close the vent hole, said float having an unobstructed longitudinal hole formed in the center thereof and at least one unobstructed vent hole formed in the upper end of the float around the stopper head so as to communicate with the open longitudinal hole of the float, said unobstructed longitudinal hole and said unobstructed vent hole providing a continuous free passageway through said float; the inner surface of the valve compartment and the outer surface of the float forming a clearance therebetween.

* * * * *